United States Patent
Willingham

(10) Patent No.: US 7,362,826 B2
(45) Date of Patent: Apr. 22, 2008

(54) RECEIVER INCLUDING AN OSCILLATION CIRCUIT FOR GENERATING AN IMAGE REJECTION CALIBRATION TONE

(75) Inventor: Scott D. Willingham, Austin, TX (US)

(73) Assignee: Silicon Laboratories, Inc., Austin, TX (US)

( * ) Notice: Subject to any disclaimer, the term of this patent is extended or adjusted under 35 U.S.C. 154(b) by 745 days.

(21) Appl. No.: 10/673,905

(22) Filed: Sep. 29, 2003

(65) Prior Publication Data
US 2005/0069056 A1    Mar. 31, 2005

(51) Int. Cl.
H03D 3/18    (2006.01)

(52) U.S. Cl. ............... 375/327; 375/219; 375/220; 375/221; 375/222; 331/4; 331/10; 331/11; 331/12; 331/14; 455/302; 455/73; 455/78; 455/83; 455/304

(58) Field of Classification Search .......... 375/219, 375/220, 221, 222, 327
See application file for complete search history.

(56) References Cited

U.S. PATENT DOCUMENTS

| | | | | |
|---|---|---|---|---|
| 4,434,407 | A * | 2/1984 | Healey et al. | 331/4 |
| 4,471,328 | A * | 9/1984 | Chapman | 332/112 |
| 5,512,860 | A * | 4/1996 | Huscroft et al. | 331/1 A |
| 6,137,999 | A * | 10/2000 | Lovelace et al. | 455/302 |
| 6,760,577 | B2 * | 7/2004 | Li | 455/323 |
| 6,968,167 | B1 * | 11/2005 | Wu et al. | 455/251.1 |
| 7,035,341 | B2 | 4/2006 | Mohindra | |
| 2002/0177425 | A1 | 11/2002 | Li | |
| 2003/0138034 | A1 * | 7/2003 | Shi et al. | 375/219 |
| 2003/0181187 | A1 * | 9/2003 | Liu | 455/302 |
| 2004/0002318 | A1 | 1/2004 | Kerth et al. | |
| 2004/0086057 | A1 * | 5/2004 | Lee et al. | 375/295 |

FOREIGN PATENT DOCUMENTS

EP    1164759    12/2001

OTHER PUBLICATIONS

"Adaptive IQ Mismatch Cancellation for Quadrature IF Receivers", Mikhael, et al; Technical Report, University of Central Florida, 2001; http://www.cnel.ufl.edu/~pravin/iq.pdf.

(Continued)

Primary Examiner—Chieh M. Fan
Assistant Examiner—Siu M Lee
(74) Attorney, Agent, or Firm—Meyertons Hood Kivlin Kowert & Goetzel, P.C.

(57) ABSTRACT

A receiver circuit includes an oscillator circuit configured to generate a calibration tone and a phase locked loop (PLL) reference signal. An output frequency of the VCO may be divided by respective amounts to derive a desired calibration tone frequency and a desired PLL reference signal frequency. In addition to the oscillator circuit, the receiver circuit may further include a phase locked circuit configured to generate a PLL output signal that is phase locked in relation to the PLL reference signal. During a calibration mode, a quadrature generator may be used to generate quadrature mixer local oscillator signals dependent upon the PLL output signal, and an in-phase/quadrature mixer may be used to mix the calibration tone with the quadrature mixer LO signals.

16 Claims, 4 Drawing Sheets

OTHER PUBLICATIONS

"Circuits and Algorithms for Wireless Communications", Messerschmitt, et al; Technical Report, University of Central Florida; http://www.ucop.edu/research/micro/00_01/00_066.pdf, 2002.

"Algorithms and Components for Data Transmission and Video Encoding", Gray, et al; Final Report 1997-1998, http://www.ucop.edu/research/micro/96_97/96_015.pdf.

"A Self-Adapting RF CMOS Image-Rejection Mixer", Rudell, et al, Technical Report, Aug. 13, 2003.

"Reduced Filter Requirements Using an Ultra Low Noise Modulator", *Microwave Journal*, vol. 44, No. 1, Norwood, MA, Jan. 2001.

International search report application No. PCT/US2004/031851 mailed Dec. 22, 2004.

* cited by examiner

Input to RF-LO IQ mixer

Output of RF-LO IQ mixer

US 7,362,826 B2

RECEIVER INCLUDING AN OSCILLATION CIRCUIT FOR GENERATING AN IMAGE REJECTION CALIBRATION TONE

BACKGROUND OF THE INVENTION

1. Field of the Invention

This invention relates to radio frequency communication systems including transceivers and, more particularly, to the generation of calibration tones for receiver image rejection calibration.

2. Description of the Related Art

In many modern communication systems, information is transmitted and received by modulating a radio frequency (RF) carrier signal with a data signal and then demodulating the RF signal to recover the data signal. Demodulating an RF carrier signal usually involves tuning a receiver to the carrier signal, which may be at a substantially higher frequency than the frequencies of the data it conveys. For example, a carrier signal frequency may be on the order of 1-2 GHz, whereas the bandwidth of the data channel conveyed by the carrier-signal may be on the order of only 100-200 kHz.

In one approach to demodulating an RF signal, a bandpass filter having a bandwidth approximately equal to the data channel bandwidth may be tuned to the RF carrier signal frequency, and the filter output may be demodulated according to the original modulation scheme. However, narrow-bandwidth bandpass filters become increasingly difficult and bulky to implement as their center frequencies increase. Consequently, many RF receiver systems use some form of heterodyning to convert a received RF signal to a lower frequency (referred to as an intermediate frequency, or IF), where the task of filtering may be easier.

Generally speaking, heterodyning a signal involves mathematically multiplying one signal, such as an RF signal, with a second signal close in frequency to the first, often referred to as a local oscillator (LO). Such an operation, also referred to as mixing, results in signals at frequencies equal to the sum and difference of the RF frequency and the LO frequency. The sum frequency is usually substantially higher than the RF or LO frequency and may be readily filtered using a simple low-pass filter. The difference frequency is the IF frequency, which may be close to DC and is therefore readily manipulated by simple filters.

Typical heterodyne systems are susceptible to a phenomenon referred to as imaging. As described above, a given desired RF frequency $f_{RF}$ differs from a given LO frequency $f_{LO}$ by the IF frequency $f_{IF}$. Further, a given desired RF frequency may lie either above or below the LO frequency. However, due to its symmetric properties, heterodyning will select any RF signal differing from $f_{LO}$ by $f_{IF}$, irrespective of whether the RF signal lies above or below the given LO frequency. In heterodyne systems generally, for a given RF signal of frequency $f_{RF}=f_{LO}\pm f_{IF}$, the frequency $f_{image}=f_{LO}\mp f_{IF}$ may be referred to as the image frequency.

To prevent interference with the desired RF signal, the image frequency may be filtered prior to heterodyne mixing. In some systems, quadrature receiver architectures may be employed that facilitate image frequency rejection by splitting the desired RF signal into two paths and mixing each path with a respective function of the LO signal, where the respective functions may have a particular phase relationship (such as sine and cosine functions). One of the paths is typically referred to as the in-phase (I) signal path while the other path is referred to as the quadrature (Q) signal path. Quadrature IF mixing inherently provides a property that makes the cancellation of the image signal possible without the use of expensive and bulky image filters. For example, when one of the I and Q signals output from the IQ mixer is phase shifted and the I and Q signals are summed, the image frequency may be cancelled. However, imbalances in the gain and phase relationships between the two paths may yield imperfect image frequency cancellation, and thus result in a residual image frequency. This residual image frequency may cause undesired interference that may limit the performance of the receiver.

Accordingly, to accommodate improved rejection or cancellation of the image frequency, some receivers may use a calibration tone to calibrate the receiver to account for imbalances in the gain and phase relationships between the I and Q paths. For example, in some systems, a calibration tone generated at the image frequency may be provided to the input of a quadrature mixer during a calibration mode. A residual image signal may then be measured to derive appropriate gain and/or phase adjustments to be applied to the I and/or Q signal paths to thereby attain improved image rejection capabilities.

SUMMARY OF THE INVENTION

Various embodiments of a receiver and method including an oscillation circuit for generating an image rejection calibration tone are disclosed. In one embodiment, a receiver circuit includes an oscillator circuit configured to generate a calibration tone and a phase locked loop (PLL) reference signal. In one particular implementation, the oscillator circuit may include an oscillator such as a VCO (voltage controlled oscillator). During a calibration mode, the VCO may be operated in an open loop mode, and an output frequency of the VCO may be divided by respective amounts to derive a desired calibration tone frequency and a desired PLL reference signal frequency. In another mode, the VCO may be employed as a transmitter oscillator within an offset phase locked loop circuit of a transmitter.

In addition to the oscillator circuit, the receiver circuit may further include a phase locked circuit configured to generate a PLL output signal that is phase locked in relation to the PLL reference signal. During the calibration mode, a quadrature generator may be used to generate quadrature mixer local oscillator signals dependent upon the PLL output signal, and an in-phase/quadrature mixer may be used to mix the calibration tone with the quadrature mixer LO signals.

Broadly speaking, a receiver circuit is contemplated that comprises an oscillator circuit configured to generate a calibration tone and a phase locked loop (PLL) reference signal. The receiver circuit may also include a phase locked loop circuit configured to generate a PLL output signal that is phase locked in relation to the PLL reference signal, a quadrature generator configured to generate quadrature mixer local oscillator (LO) signals dependent upon the PLL output signal, and an in-phase/quadrature (IQ) mixer configured to mix the calibration tone with the quadrature mixer LO signals.

Figure 1:
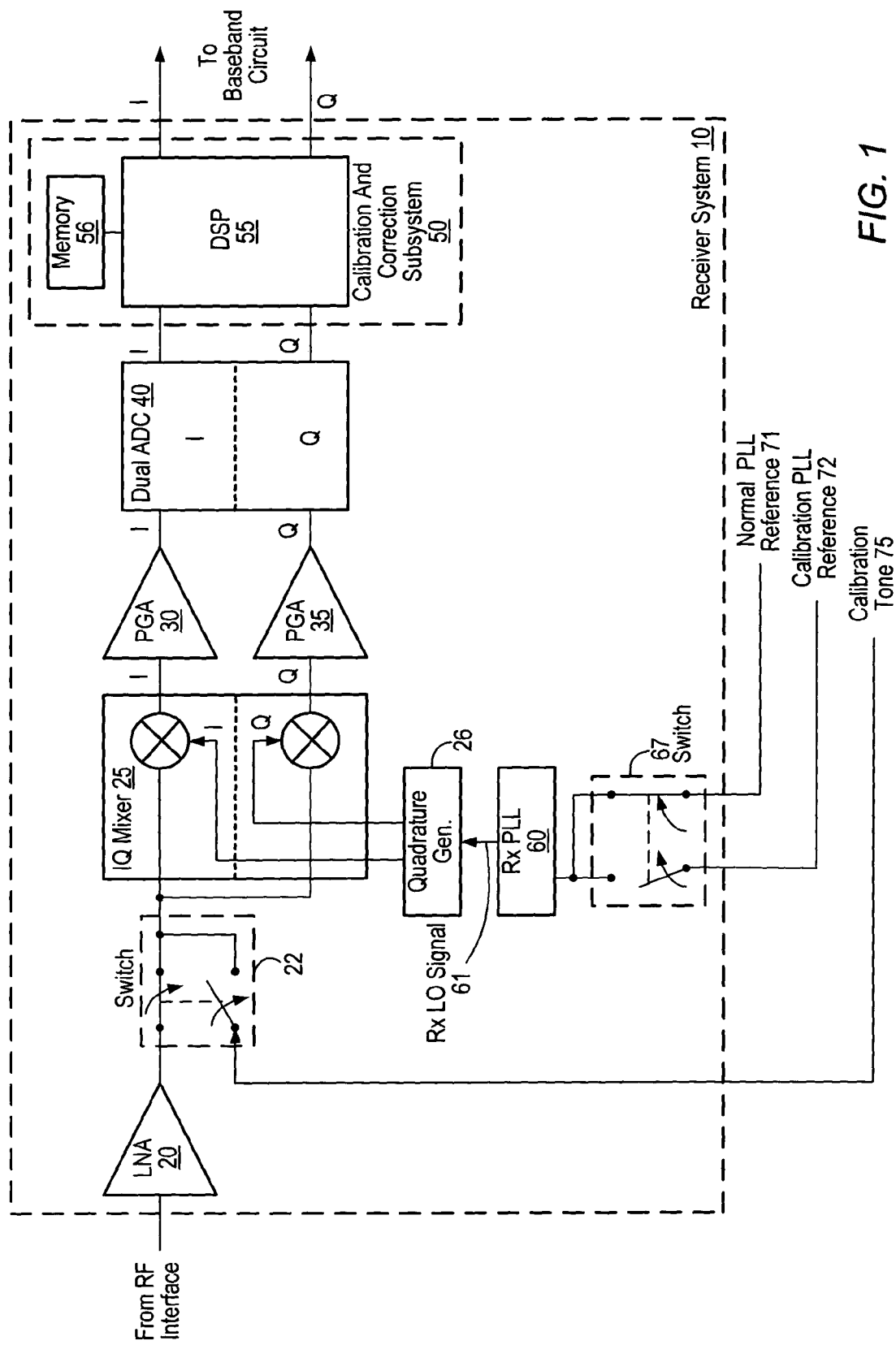
FIG. 1 is a block diagram of one embodiment of a receiver system.

While the invention is susceptible to various modifications and alternative forms, specific embodiments are shown by way of example in the drawings and are herein described in detail. It should be understood, however, that drawings and detailed description thereto are not intended to limit the invention to the particular form disclosed, but on the contrary, the invention is to cover all modifications, equivalents and alternatives falling within the spirit and scope of the present invention as defined by the appended claims.

DETAILED DESCRIPTION

Turning now to FIG. 1, a block diagram of one embodiment of a receiver system 10 is shown. Receiver system 10 may be configured to operate within a wireless communication device, such as a cellular telephone handset or a wireless data modem, for example. In general, receiver system 10 may be configured to receive an incoming radio frequency (RF) signal from an RF interface (not shown), which may include elements such as an antenna, filters, switches, and amplifier stages. Receiver system 10 may also be configured to down-convert the frequency of the received RF signal and to provide the down-converted signal to a baseband circuit (not shown) for demodulation and decoding of the signal.

In some embodiments, receiver system 10 may be a subsystem of a transceiver that may further include a transmitter system (not shown in FIG. 1). Such a transmitter system may be configured to receive a modulated baseband signal from a baseband circuit and to generate a modulated carrier at the higher intermediate frequency (IF). The transmitter system may also be configured to up-convert the resultant IF signal and provide a modulated radio frequency (RF) output signal to the RF interface, which may include transmission power amplifiers and filters in addition to the RF reception elements.

In the illustrated embodiment, receiver system 10 includes a low noise amplifier (LNA) 20 coupled through a switch 22 to an in-phase/quadrature (IQ) mixer 25. A receiver phase locked loop (RX PLL) circuit 60 is coupled to provide a receiver local oscillator (RX LO) signal 61 to a quadrature generator 26, which is in turn coupled to provide quadrature LO signals to IQ mixer 25. The in-phase (I) and quadrature (Q) outputs of IQ mixer 25 are coupled to programmable gain amplifiers (PGAs) 30 and 35, respectively. PGAs 30 and 35 are coupled to a dual analog-to-digital converter (ADC) 40, which is in turn coupled to a calibration and correction subsystem 50. In the embodiment of FIG. 1, calibration and correction subsystem 50 includes a digital signal processor (DSP) 55 coupled to a memory 56.

During normal operation of receiver system 10, the receiver local oscillator (RX LO) signal 61 output from RX PLL 60 is generated at a selected frequency to tune the receiver system 10 to a desired channel. The RX LO signal 61 is phase locked to a reference signal 71 (referred to herein as normal PLL reference signal 71), which is coupled through a switch 67. An incoming modulated RF signal received by the RF interface is amplified by LNA 20. The amplified RF signal is passed through switch 22 and applied to both the I and Q portions of IQ mixer 25. The quadrature LO signals generated by quadrature generator 26 are 90 degrees out of phase, and are mixed with the incoming RF signal by IQ mixer 25 to produce a modulated I and Q signal pair at an IF frequency.

The modulated I and Q signal pair is amplified by PGAs 30 and 35 and input into respective portions of the dual ADC 40. In one embodiment, dual ADC 40 may include a pair of delta-sigma converters configured to convert the I and Q signals into respective I and Q bit streams which are input into DSP 55 of calibration and correction subsystem 50 for processing. As used herein, the portions of receiver system 10 that separately process and propagate the I and Q signals, respectively, are referred to as the I and Q channels (or the I and Q signal paths).

The modulated IF signal produced by mixing the received RF signal with the quadrature LO signals includes a useful signal and an undesired image signal. The image signal may interfere with processing of the useful signal and may need to be suppressed.

Figure 2:
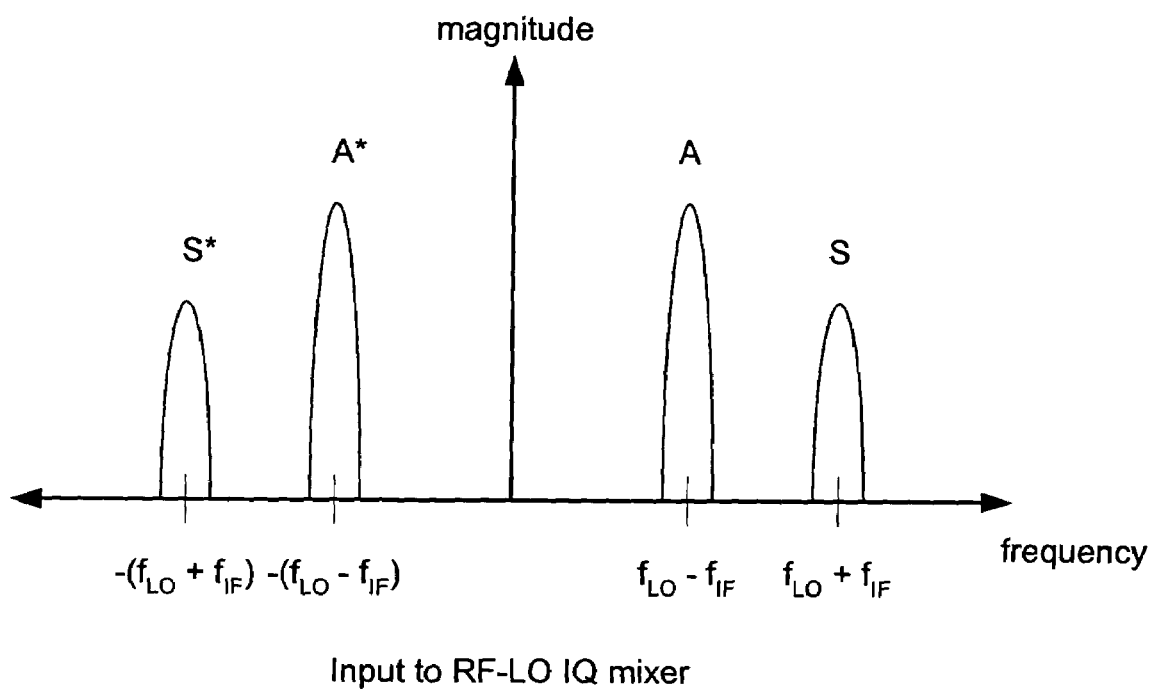
FIG. 2 is an illustration of the phenomenon of imaging in one embodiment of the receiver system of FIG. 1.
Figure 2:
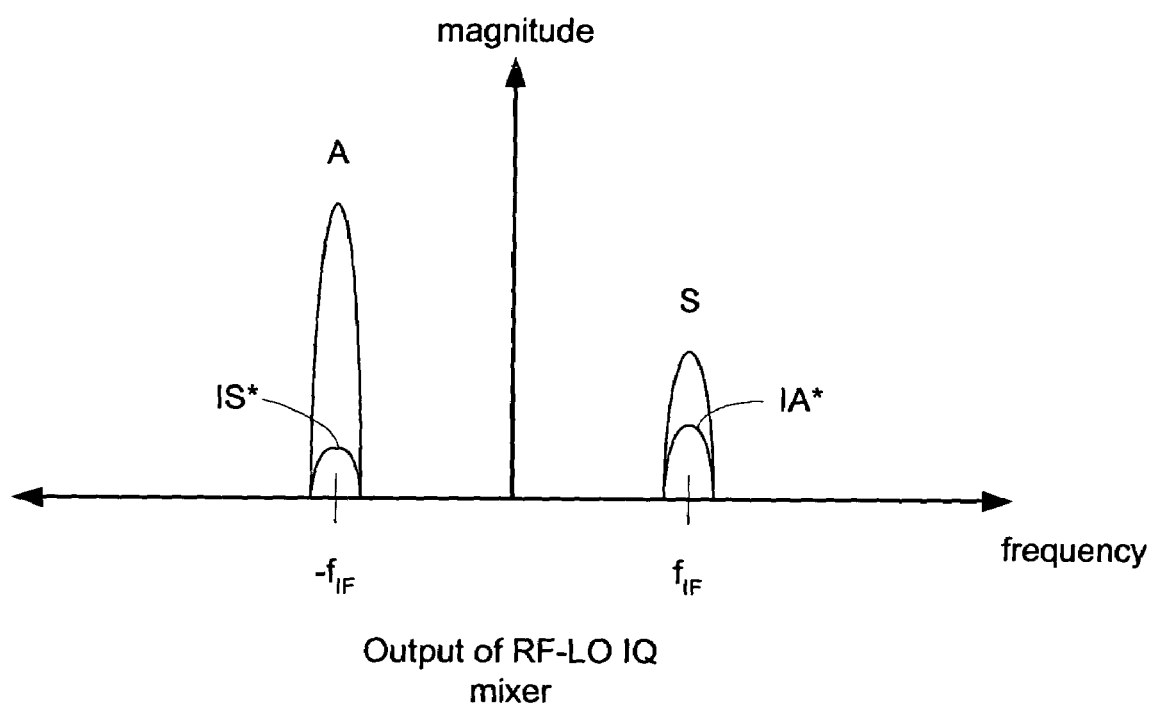

FIG. 2 graphically illustrates the phenomenon of imaging in one embodiment of receiver system 10. Specifically, FIG. 2 illustrates the spectral distribution of an exemplary combination of signals at the input to and output of IQ mixer 25. At the input to IQ mixer 25, a complex signal of interest S may be present at a frequency $f_{LO}+f_{IF}$ while an unrelated complex signal A may be present at the image frequency of S, $f_{LO}-f_{IF}$. In one embodiment, $f_{IF}$ may be chosen to be the same frequency as the channel spacing frequency for a particular RF communication standard, such as 200 kHz. In such an embodiment, signal A may represent a signal in a different channel than signal S and may have a larger magnitude than signal S. In the illustrated example, signal A is two channels removed from signal S and may be referred to as an alternate channel signal relative to signal S. As signals S and A are complex, conjugate signal versions S* and A* exist in the negative frequency plane at frequencies $-(f_{LO}+f_{IF})$ and $-(f_{LO}-f_{IF})$, respectively.

Generally speaking, mixing or mathematically multiplying a given signal with a frequency conversion signal (such as a single-frequency tone, for example) results in a new signal having frequencies corresponding to sums and differences of the given signal's frequencies with the frequencies of the frequency conversion signal. Thus, mixing signals S and A and their conjugates with the RX LO signal at $f_{LO}$ in IQ mixer 25 results in signals at frequencies corresponding to the sums and differences of the original signal frequencies with $f_{LO}$. As shown in the diagram illustrating the spectral distribution at the output of IQ mixer 25, this results in signal S and signal A being translated to $f_{IF}$ and $-f_{IF}$, respectively. (Such mixing also results in high-frequency terms on the order of $2f_{LO}$ that subsequently may be filtered from the mixer output.) However, addition of $f_{LO}$ to the negative frequencies corresponding to signals S* and A* results in image signal A* being mixed onto signal S and conversely, image signal S* being mixed onto signal A. As illustrated in FIG. 2, the conjugate components are attenuated by a native image rejection factor I, such that the magnitude of A* is reduced in the process of mixing it onto signal S. In an ideal quadrature receiver system lacking gain or phase differences between the I and Q signal paths (i.e., a system in which, for example, IQ mixer 25 and all downstream components such as PGAs 30 and 35 and dual ADC 40 are perfectly matched), native image rejection factor I may be zero, resulting in no mixing of image signals onto desired signals. However, in real receiver systems, gain and phase imbalances may limit native image rejection to the point where an image signal interferes unacceptably with the signal of interest.

Mathematically, the function of IQ mixer 25 as illustrated in FIG. 1 may be represented as:

$$y(t) = S(t)e^{j2\pi f_{IF}t} + IA^*(t)e^{j2\pi f_{IF}t} + A(t)e^{-j2\pi f_{IF}t} + IS^*(t)e^{-j2\pi f_{IF}t}$$

where the first term represents the signal of interest S mixed to the frequency $f_{IF}$, the second term represents the image signal A* attenuated by native image rejection factor I and mixed to the frequency $ff_{IF}$, the third term represents unrelated signal A mixed to the frequency $-f_{IF}$, and the fourth term represents the image signal S* attenuated by native image rejection factor I and mixed to the frequency $-f_{IF}$.

The mathematical function of IQ mixer 25 suggests that if native image rejection factor I could be made close to zero, mixing of image signals onto signals of interest may be significantly reduced. In some embodiments, native image rejection factor I may be reduced by directly reducing the phase and gain mismatches of the various components in the I and Q signal paths that tend to increase I as described above. In other embodiments, native image rejection factor I may be reduced mathematically by applying a correction factor.

Accordingly, referring back to FIG. 1, calibration and correction subsystem 50 is provided to determine one or more correction parameters that may be used to further reduce the native image rejection factor I, and thus the residual image frequency present in the signal of interest. More particularly, in one embodiment, during a calibration mode of operation of receiver system 10, a calibration tone 75 is provided through switch 22 to the input of IQ mixer 25 instead of the amplified RF signal provided at the output of LNA 20. Calibration tone 75 may be generated at an image frequency associated with the receiver. A calibration PLL reference signal 72 is also provided through switch 67 to serve as a reference signal to RX PLL 60 in the place of normal PLL reference signal 71. Accordingly, during the calibration mode of operation, IQ mixer 25 mixes the calibration tone 75 with quadrature LO signals that are phase locked with respect to calibration PLL reference 72, and the resultant I and Q signal pair is amplified by PGAs 30 and 35 and input into respective portions of the dual ADC 40. As will be described in further detail below, calibration tone 75 and calibration PLL reference signal 72 may be derived from a common oscillator.

Calibration and correction subsystem 50 measures the residual image associated with the I and Q signals when calibration tone 75 is applied to the system during the calibration mode of operation. Based on the measured residual image, calibration and correction subsystem 50 determines one or more correction parameters that may be used for further reducing the residual image signal. Calibration and correction subsystem 50 may perform this function in various ways, depending upon the implementation. For example, in the embodiment of FIG. 1, during the calibration mode of operation, DSP 55 may be configured to execute instructions stored within memory 56 that implement algorithms to measure the residual image signal and to determine a correction parameter in the form of a correction factor that may be applied mathematically to the I and Q signals output from ADC 40. The correction factor may be chosen such that analog gain and phase mismatches in the I and Q signal paths are compensated for mathematically. Subsequently, during the normal mode of operation when an incoming modulated RF signal is provided to IQ mixer 25 through switch 22, the determined correction factor may be similarly applied to the I and Q signals output from dual ADC 40 to provide improved cancellation of the image signal. One suitable implementation of a calibration and correction subsystem is described in co-pending U.S. patent application Ser. No. 10/675,601, filed concurrently herewith and entitled "Apparatus And Method For Digital Image Correction In A Receiver," which is hereby incorporated by reference in its entirety.

In alternative embodiments, the residual image frequencies may be reduced or canceled directly by adjusting the gain and/or phase characteristics of one or both of the analog I and Q signal paths. In such an embodiment, during the calibration mode of operation, the calibration and correction subsystem 50 may be configured to measure the residual image associated with the I and Q signals when calibration tone 75 is applied to the system. Based on the measured residual image, calibration and correction subsystem 50 may determine one or more correction parameters conveyed in the form of control signals that control the gain and/or phase characteristics of one or more of the components forming the I and Q signal paths, such as IQ mixer 25 and/or PGAs 30 and 35, and/or to control the phases of the I and Q quadrature LO signal generated by quadrature generator 26.

It is noted that while the depicted embodiment includes a DSP 55 and memory 56, it is contemplated that other devices capable of measuring the residual image signal and determining one or more correction parameters to further reduce the image signal during the calibration mode may be employed in other embodiments. For example, the functions and algorithms of calibration and correction subsystem 50 as described above may be implemented using other types of devices, such as general-purpose microprocessors, application-specific integrated circuits (ASICs), or hard-coded custom logic. Still further, embodiments of calibration and correction subsystem 50 are possible in which a residual image signal during the calibration mode is measured using analog techniques. Such embodiments of receiver system 10 may omit ADC 40.

It is also noted that in some embodiments, it may be beneficial during the calibration mode of operation to clock ADC 40 and/or calibration and correction subsystem 50 using calibration PLL reference signal 72 (or a frequency multiple of calibration PLL reference signal 72). This may accommodate enhanced sampling and signal processing capabilities.

Regardless of the manner in which the residual image is measured during the calibration mode of operation, it may be important that the calibration tone 75 be offset precisely from the receiver local oscillator (RX LO) signal 61. For example, it may be important that any drift in the frequency of calibration tone 75 also be reflected in the frequency of receiver local oscillator (RX LO) signal 61.

Figure 3:
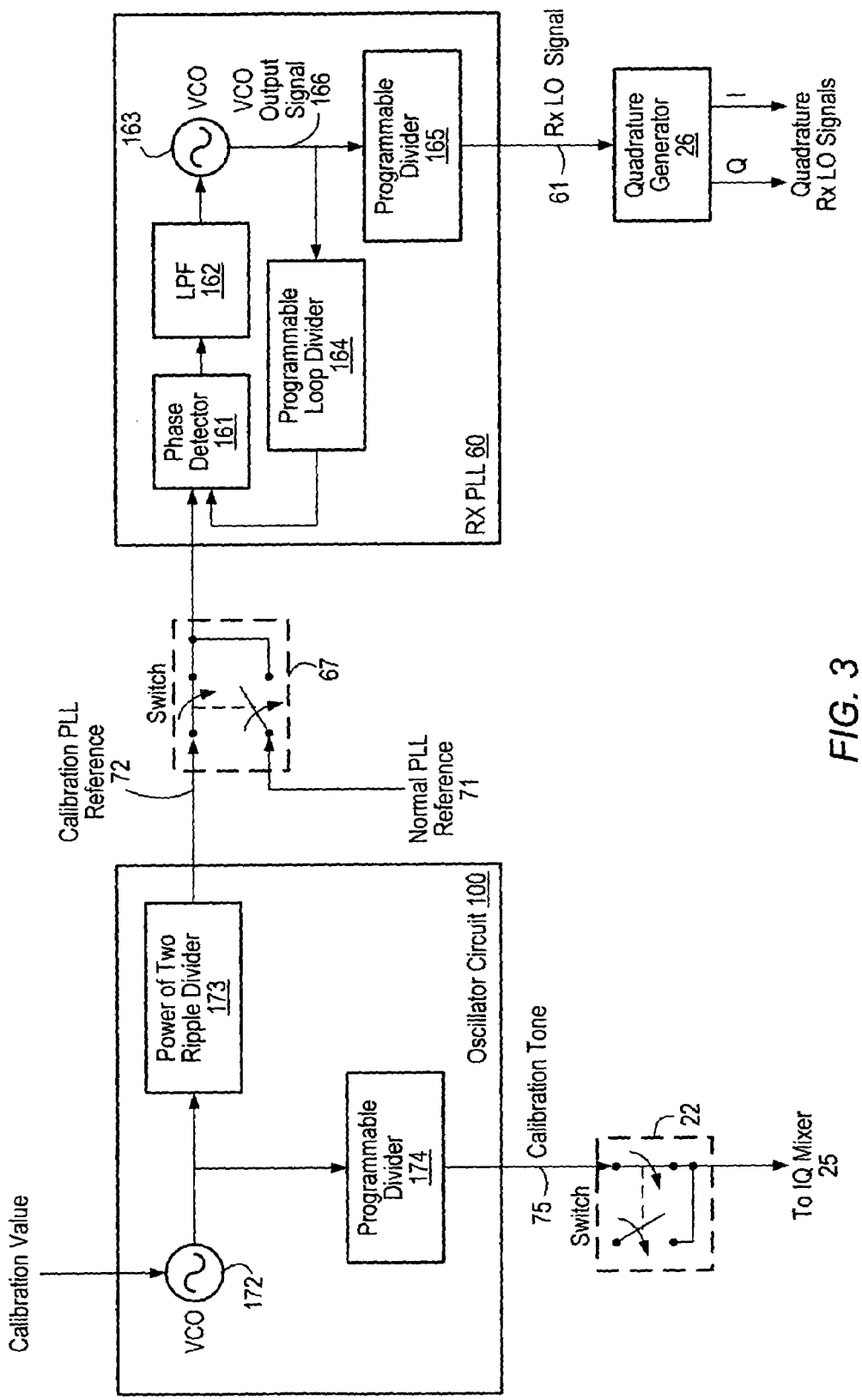
FIG. 3 is a block diagram that illustrates circuitry associated with the generation of a calibration tone and a receiver local oscillator signal in one embodiment.

FIG. 3 is a block diagram that illustrates circuitry associated with the generation of calibration tone 75 and receiver local oscillator (RX LO) signal 61 in one embodiment. Circuit portions that correspond to those of FIG. 1 are numbered identically for simplicity and clarity.

During the calibration mode of operation, an oscillator circuit 100 generates calibration tone 75 and calibration PLL reference 72. As stated previously, during the calibration mode, switch 22 is controlled to provide calibration tone 75 to the input of mixer 25 in the place of an amplified RF signal from LNA 20. In addition, switch 67 is controlled to provide calibration PLL reference 72 as an input reference signal to RX PLL 60 in the place of normal PLL reference 71.

In the illustrated embodiment, oscillator circuit 100 includes a voltage-controlled oscillator (VCO) 172 that is coupled to a power-of-two ripple divider 173 and a programmable divider 174. It is noted that in some embodiments, VCO 172 may also be employed as a transmitter oscillator associated with an offset phase locked loop (OPLL) circuit of a transmitter system, as discussed below. As shown, calibration PLL reference 72 is provided from an output of power-of-two ripple divider 173, and calibration tone 75 is provided from an output of programmable divider 174.

In the embodiment of FIG. 3, RX PLL 60 includes a phase detector 161 that is coupled to receive calibration PLL reference signal 72 during the calibration mode. Phase detector 161 generates an output signal corresponding to the phase difference between the calibration PLL reference signal 72 and a feedback signal provided at an output of a programmable loop divider 164. The output signal of phase detector 161 is provided to a low pass filter (LPF) 162, which in turn generates a voltage that controls the frequency of VCO 163. In accordance with this conventional feedback arrangement, an output signal 166 of VCO 163 may be phase locked with the calibration PLL reference signal 72.

RX PLL 60 may further include a programmable divider 165. In one embodiment, programmable divider 165 may be controlled to divide the frequency of the VCO output signal 166 to derive a desired frequency of the receiver local oscillator (RX LO) signal 61.

In one embodiment, during the calibration mode of operation, VCO 172 may be coarsely tuned to operate at a target frequency in an open loop mode. For example, in one implementation, the frequency of VCO 172 may be coarsely tuned according to a digital calibration value stored within, for example, a configuration register (not shown). As used herein, the open loop mode of VCO 172 refers to an operation of VCO 172 wherein its output frequency does not depend upon phase related feedback in a closed loop. In one particular embodiment, VCO 172 may be implemented using a variably controlled capacitance structure as disclosed in U.S. Pat. No. 6,549,764 entitled "Method and Apparatus For Selecting Capacitance Amounts To Vary The Output Frequency Of A Controlled Oscillator," which is hereby incorporated by reference in its entirety.

The particular frequencies at which receiver local oscillator (RX LO) signal 61, calibration PLL reference signal 72 and calibration tone 75 are generated may vary depending upon the implementation. The frequencies of these signals may further depend upon an operating mode of the receiver system. For example, in one embodiment, receiver system 10 may be used in a hand held wireless communication device operable under the Global System for Mobile Communication (GSM) 900 standard. As such, receiver system 10 may operate in the 900 MHz frequency spectrum with channel spacings 200 kHz apart. As described above, unfiltered image signals present in the 900 MHz spectrum (which may correspond to adjacent channel signals) may be translated into the IF spectrum. Assuming the intermediate frequency (IF) of receiver system 10 is chosen in the 200 kHz range, for example, a relatively strong translated image signal may be present.

Accordingly, during the calibration mode, calibration tone 75 may be generated at a specific frequency of say, for this example, 942.5 MHz. In one implementation of receiver system 10, to generate calibration tone 75 at 942.5 MHz, VCO 172 may be set to operate at a target frequency of 3770 MHz, and programmable divider 174 may be set to perform a divide by four function.

In addition, assume the receiver local oscillator (RX LO) signal 61 is generated at a frequency of 230.1 kHz above the frequency of calibration tone 75, or 942.7301 MHz. At such frequencies, when calibration tone 75 is mixed with the quadrature LO signals by IQ mixer 25, the calibration tone 75 is translated to a baseband tone at −230.1 kHz. As discussed previously, depending upon mismatches in the I and Q signal paths, an undesired signal at 230.1 kHz may also be present. Calibration and correction subsystem 50 may therefore be employed to determine one or more correction parameters to reduce or cancel this signal.

As described above, during the calibration mode of operation, it may be important that the calibration tone 75 be offset precisely from the RX LO signal 61. Thus, in the embodiment of FIG. 3, the output signal of VCO 172, from which calibration tone 75 is derived, is also used to derive calibration PLL reference 72. RX PLL 60 in turn generates the RX LO signal 61 in phase alignment with calibration PLL reference 72. Accordingly, drifting in the frequency of calibration tone 75 may as be reflected in the frequency of RX LO signal 61.

Continuing with the above example, to generate receiver local oscillator (RX LO) signal 61 at a frequency of 942.7301 MHz, VCO 163 of RX PLL 60 may be controlled to generate a VCO output signal 166 at a frequency of 7541.841 MHz while programmable divider 165 is set to provide a divide by eight function. In addition, in one particular implementation, divider 173 may be configured to perform a divide by 8192 function. Thus, given a VCO 172 frequency of 3770 MHz, calibration PLL reference signal 62 will be generated at a frequency of about 460.2 kHz. To match the reference frequency of 460.2 kHz at the input of phase detector 161, a divisor value may be programmed into programmable loop divider 164 equal to 7541.841 MHz/460.2 kHz=16388.

In accordance with the circuitry as illustrated in FIG. 3, the receiver local oscillator (RX LO) signal 61 is locked to a reference signal that is derived by dividing the output frequency of VCO 172. Thus, even when VCO 172 is approximately tuned and allowed to drift, the frequency difference between the receiver local oscillator (RX LO) signal 61 and calibration tone 75 may be well controlled such that uncertainties in the output frequencies of IQ mixer 25 may be held relatively low.

It is noted that the specific divide functions (i.e., devisor values) of programmable dividers 164, 165 and 174 may differ from those specified in the example above depending upon the RF spectrum of interest as well as the intermediate frequency used within receiver system 10. For example, in one embodiment, receiver system 10 may be operable under the Digital Cellular System (DCS 1800) standard. In one particular implementation when operating under the DCS 1800 standard, programmable divider 165 may be set to provide, for example, a divide by four function while programmable divider 174 may be set to provide, for example, a divide by two function. It is further noted that in alternative embodiments, dividers 164, 165 and 174 may provide fixed rather than programmable divide functions. In addition, in various alternative embodiments, one or more of the divider circuits 164, 165 and 174 may be omitted, depending upon the desired frequencies to be generated.

It is also noted that, although divider 173 is depicted as a power-of-two ripple divider in the embodiment of FIG. 3, it is contemplated that in other embodiments, divider 173 may be implemented using other specific divider configurations.

Still further, other specific configurations of RX PLL 60 are also possible. In general, RX PLL 60 is provided to generate a receiver local oscillator (RX LO) signal 61 that is phase locked to calibration PLL reference 62 during the calibration mode. It is noted that in some embodiments, programmable loop divider 164 (or any of the other programmable dividers of FIG. 3) may be implemented by serializing two or more separately programmable divider circuits.

Figure 4:
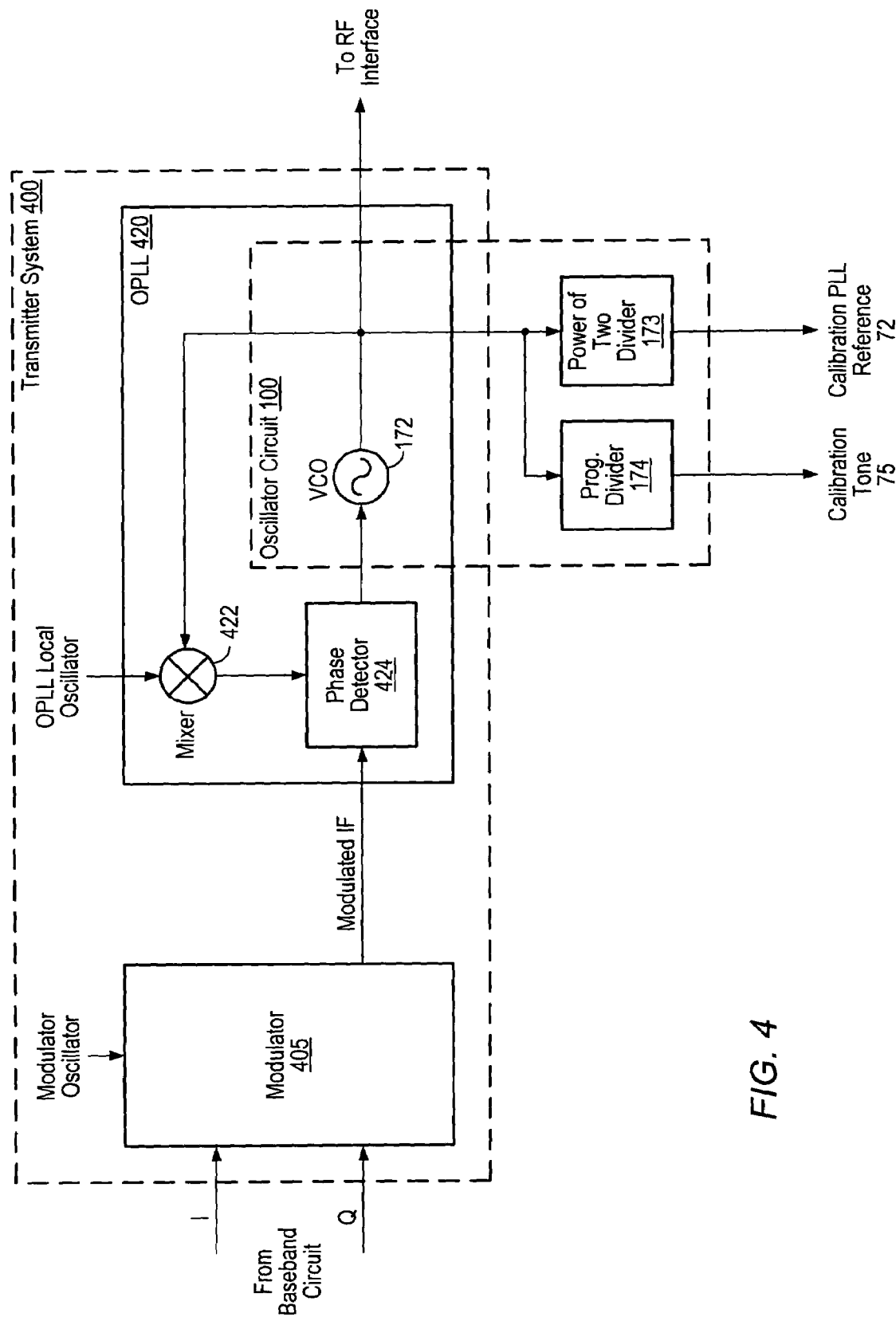
FIG. 4 is a block diagram of one embodiment of a transmitter system.

Turning finally to FIG. 4, a block diagram of a transmitter system 400 is shown in which VCO 172 is employed as a transmitter oscillator associated with an offset phase locked loop (OPLL) circuit. It is noted that the illustration of FIG. 4 is presented herein primarily to depict the use of VCO 172 within a transmitter system. Numerous specific transmitter architectures and implementations may be possible that employ VCO 172 as a transmitter oscillator. In addition, various components such as divider circuitry and filter circuitry not shown specifically within FIG. 4 may further be included within embodiments of transmitter system 400, depending upon the implementation.

During a transmit mode of operation of transmitter system 400, I and Q modulated baseband signals may be mixed in a modulator 405 with a modulator oscillator signal to produce a modulated IF signal. The modulated IF signal is provided to an offset phase locked loop (OPLL) circuit 420 that includes VCO 172.

As illustrated, and in accordance with a conventional offset phase locked loop architecture, OPLL circuit 420 incorporates a mixer (i.e., mixer 422) that is employed in a feedback path to produce a transmit frequency that is offset from the frequency of an associated OPLL local oscillator signal. Thus, during the transmit mode of operation, mixer 422 mixes an output signal associated with VCO 172 with the OPPL local oscillator signal. The resulting output of mixer 422, (which may be passed through a low pass filter), is provided to an input of a phase detector 424. Phase detector 424 compares the phase of this signal with a phase of the modulated IF signal, and generates a voltage that is proportional to the difference in the phases of the two input signals. The output of phase detector 424 may then be filtered to provide a feedback signal to control the frequency of VCO 172. A resulting modulated RF signal at the output of VCO 172 may accordingly be passed to an RF interface for wireless transmission.

In various embodiments, a transceiver may include both receiver system 10 and transmitter system 400. During normal operation, VCO 172 may be configured to operate as a transmitter VCO in a closed loop, as illustrated in FIG. 4. During a calibration mode of the transceiver, the VCO 172 may be set to operate in an open loop, as illustrated in FIG. 3, and may be used to generate both a receiver phase locked loop reference signal and a calibration tone.

In some implementations, it is noted that programmable dividers 164 and 165 of RX PLL 60 may be operational during the normal mode of operation of receiver system 10 to accommodate synthesis of a receiver local oscillator signal at a desired frequency. Programmable divider 174 may likewise be incorporated to divide the frequency of the output signal of VCO 172 in a desired manner during the normal mode of operation of transmitter system 400. In such implementations, only a relatively small amount of additional circuitry (e.g., power-of-two ripple divider 173, switch 22 and switch 67) may be necessary to facilitate generation of an appropriate calibration tone during the calibration mode of operation.

In the illustrated embodiment, receiver system 10 is a heterodyne system using a single IF frequency. However, it is contemplated that the circuitry for generating a calibration tone and receiver local oscillator signal as discussed above may be employed within receiver systems conforming to other receiver architectures, such as a multiple-conversion architecture using multiple IF frequencies, for example.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A receiver circuit comprising:
    an oscillator circuit including an oscillator configured to generate an oscillator signal, wherein the oscillator signal is divided by a first amount to generate a calibration tone and by a second amount to generate a phase locked loop (PLL) reference signal;
    a phase locked loop circuit configured to generate a PLL output signal that is phase locked in relation to the PLL reference signal;
    a quadrature generator configured to generate quadrature mixer local oscillator (LO) signals derived from the PLL output signal; and
    an in-phase/quadrature (IQ) mixer configured to mix the calibration tone with the quadrature mixer LO signals;
    a first switch coupled to selectively provide the calibration tone to the IQ mixer during a calibration mode of operation; and
    a second switch coupled to selectively provide the PLL reference signal to the phase locked loop circuit during the calibration mode of operation, and to provide a different reference signal to the phase locked loop circuit during a normal mode of operation.

2. The receiver circuit as recited in claim 1, wherein during the calibration mode of operation the oscillator is configured to operate near a particular frequency in an open loop mode.

3. The receiver circuit as recited in claim 2, wherein the oscillator is a voltage controlled oscillator.

4. The receiver circuit as recited in claim 2, wherein the oscillator circuit includes a first divider circuit configured to divide a frequency of the oscillator signal by the second amount to generate the PLL reference signal.

5. The receiver circuit as recited in claim 4, wherein the first divider circuit is a power of two ripple divider.

6. The receiver circuit as recited in claim 4 further comprising a second divider circuit configured to divide the frequency of the oscillator signal by the first amount to generate the calibration tone.

7. The receiver circuit as recited in claim 6 wherein the second divider circuit is a programmable divider.

8. The receiver circuit as recited in claim 1, wherein the first switch is further coupled to selectively provide a receiver RF input signal to the IQ mixer during a normal mode of operation.

9. The receiver circuit as recited in claim 8 further comprising an amplifier coupled to amplify the receiver RF input signal prior to mixing in the IQ mixer.

10. The receiver circuit as recited in claim 1, wherein the IQ mixer generates an in-phase (I) signal and a quadrature (Q) signal that are conveyed through an I channel and a Q channel, respectively, for processing by a baseband circuit.

11. The receiver circuit as recited in claim 10 further comprising a calibration subsystem coupled to receive representations of the in-phase (I) signal and the quadrature (Q) signal, wherein the calibration subsystem is configured to determine one or more correction parameters for canceling a residual image signal.

12. The receiver circuit as recited in claim 11 further comprising an analog-to-digital converter coupled to convert the I and Q signals generated by the IQ mixer to digital signals.

13. The receiver circuit as recited in claim 4, wherein during another mode of operation the oscillator is coupled to operate as a transmit oscillator within an offset phase locked loop circuit.

14. A method comprising:
- an oscillator circuit including an oscillator generating an oscillator signal, generating a calibration tone by dividing the oscillator signal by a first amount, and a PLL reference signal by dividing the oscillator signal by a second amount;
- a phase locked loop circuit generating a PLL output signal that is phase locked in relation to the PLL reference signal;
- generating quadrature mixer LO signals dependent upon the PLL output signal;
- mixing the calibration tone with the quadrature mixer LO signals;
- selectively providing, via a first switch, the calibration tone to the IQ mixer during a calibration mode of operation; and
- selectively providing, via a second switch, the PLL reference signal to the phase locked loop circuit during the calibration mode of operation, and a different reference signal to the phase locked loop circuit during a normal mode of operation.

15. The method as recited in claim 14, further comprising the oscillator operating near a particular frequency in an open loop mode.

16. A receiver circuit comprising:
- an oscillator means including an oscillator for generating an oscillator signal, generating a calibration tone by dividing the oscillator signal by a first amount, and a PLL reference signal by dividing the oscillator signal by a second amount;
- a phase locked loop circuit generating a PLL output signal that is phase locked in relation to the PLL reference signal;
- means for generating quadrature mixer LO signals dependent upon the PLL output signal; and
- means for mixing the calibration tone with the quadrature mixer LO signals;
- means for selectively providing the calibration tone to the quadrature mixer during a calibration mode of operation; and
- means for selectively providing the PLL reference signal to the phase locked loop circuit during the calibration mode of operation, and for providing a different reference signal to the phase locked loop circuit during a normal mode of operation.

* * * * *